United States Patent
Pradeep et al.

(10) Patent No.: US 9,767,022 B2
(45) Date of Patent: *Sep. 19, 2017

(54) IN-MEMORY BUFFER SERVICE

(71) Applicant: salesforce.com, inc., San Francisco, CA (US)

(72) Inventors: Aakash Pradeep, Union City, CA (US); Adam Torman, Walnut Creek, CA (US); Alex Warshavsky, Walnut Creek, CA (US); Samarpan Jain, Fremont, CA (US); Soumen Bandyopadhyay, Glen Park, CA (US); Thomas William D'Silva, Fremont, CA (US); Abhishek Bangalore Sreenivasa, Union City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/236,195

(22) Filed: Aug. 12, 2016

(65) Prior Publication Data

US 2017/0060741 A1    Mar. 2, 2017

Related U.S. Application Data

(63) Continuation of application No. 14/705,750, filed on May 6, 2015, now Pat. No. 9,417,840.

(Continued)

(51) Int. Cl.
*G06F 12/08* (2016.01)
*G06F 5/14* (2006.01)
(Continued)

(52) U.S. Cl.
CPC ............ *G06F 12/0804* (2013.01); *G06F 5/14* (2013.01); *G06F 9/544* (2013.01); *H04L 67/28* (2013.01);
(Continued)

(58) Field of Classification Search
CPC ........ G06F 13/00; G06F 3/00; G06F 2213/00; G06F 12/0804; G06F 5/14; G06F 9/544
(Continued)

(56) References Cited

U.S. PATENT DOCUMENTS 5,577,188 A    11/1996  Zhu
5,608,872 A     3/1997  Schwartz et al.
(Continued)

OTHER PUBLICATIONS

U.S. Appl. No. 14/705,750—Notice of Allowance dated May 6, 2016, 7 pages.

*Primary Examiner* — Christopher Shin
(74) *Attorney, Agent, or Firm* — Haynes Beffel & Wolfeld LLP; Ernest J. Beffel, Jr.

(57) ABSTRACT

A capture service running on an application server receives events from a client application running on an application server to be stored in a data store and stores the events in an in-memory bounded buffer on the application server, the in-memory bounded buffer comprising a plurality of single-threaded segments, the capture service to write events to each segment in parallel. The in-memory bounded buffer provides a notification to a buffer flush regulator when a number of events stored in the in-memory bounded buffer reaches a predefined limit. The in-memory bounded buffer receive a request to flush the events in the in-memory bounded buffer from a consumer executor service. The consumer executor service consumes the events in the in-memory bounded buffer using a dynamically sized thread pool of consumer threads to read the segments of the bounded buffer in parallel, wherein consuming the events comprises writing the events directly to the data store.

20 Claims, 9 Drawing Sheets

Related U.S. Application Data

(60) Provisional application No. 62/051,107, filed on Sep. 16, 2014.

(51) Int. Cl.
*G06F 12/0804* (2016.01)
*H04L 29/08* (2006.01)
*G06F 9/54* (2006.01)

(52) U.S. Cl.
CPC ........ *G06F 9/542* (2013.01); *G06F 2205/126* (2013.01); *G06F 2212/1041* (2013.01); *G06F 2212/281* (2013.01); *G06F 2212/311* (2013.01)

(58) Field of Classification Search
USPC .............................. 710/310, 52–57; 718/318
See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,493,837 B1 | 12/2002 | Pang et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,788,521 B1 | 8/2010 | Sim-Tang |
| 7,851,004 B2 | 12/2010 | Hirao et al. |
| 8,001,297 B2 | 8/2011 | Volodarsky et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,341,282 B2 * | 12/2012 | Bassali ............... G06F 5/14 709/203 |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 9,417,840 B2 | 8/2016 | Pradeep et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0010545 A1 | 1/2004 | Pandya |

(56) References Cited

U.S. PATENT DOCUMENTS

| | | |
|---|---|---|
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0262377 A1 | 11/2005 | Sim-Tang |
| 2006/0021019 A1 | 1/2006 | Hinton et al. |
| 2008/0120389 A1 | 5/2008 | Bassali et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0327854 A1 | 12/2009 | Chhajer et al. |
| 2011/0106941 A1 | 5/2011 | Franklin |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0247216 A1 | 9/2013 | Cinarkaya et al. |

\* cited by examiner

IN-MEMORY BUFFER SERVICE

RELATED APPLICATIONS

This application in a continuation of U.S. application Ser. No. 14/705,750 filed May 6, 2015 which issued as U.S. Pat. No. 9,417,840 on Aug. 16, 2016 and which claims the benefit of U.S. Provisional Application No. 62/051,107, filed Sep. 16, 2014, the entire contents of each of which are hereby incorporated by reference herein.

TECHNICAL FIELD

This disclosure relates to the field of multi-tenant server operation, and in particular to an in-memory buffer service for a server.

BACKGROUND

A data buffer is a region of a physical memory storage used to temporarily store data while it is being moved from one place to another. In an application server implementing a data buffer, data objects may be stored in a buffer as they are retrieved from a client device or application before they are processed or sent elsewhere for more permanent storage. Buffers can be implemented in a fixed memory location in hardware, or by using a virtual data buffer in software, pointing at a location in the physical memory. Buffers are typically used when there is a difference between the rate at which data is received and the rate at which it can be processed, or in the case where these rates are variable. A buffer can be used to adjust timing by implementing a queue algorithm in memory, simultaneously writing data into the queue at one rate and reading it at another rate.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
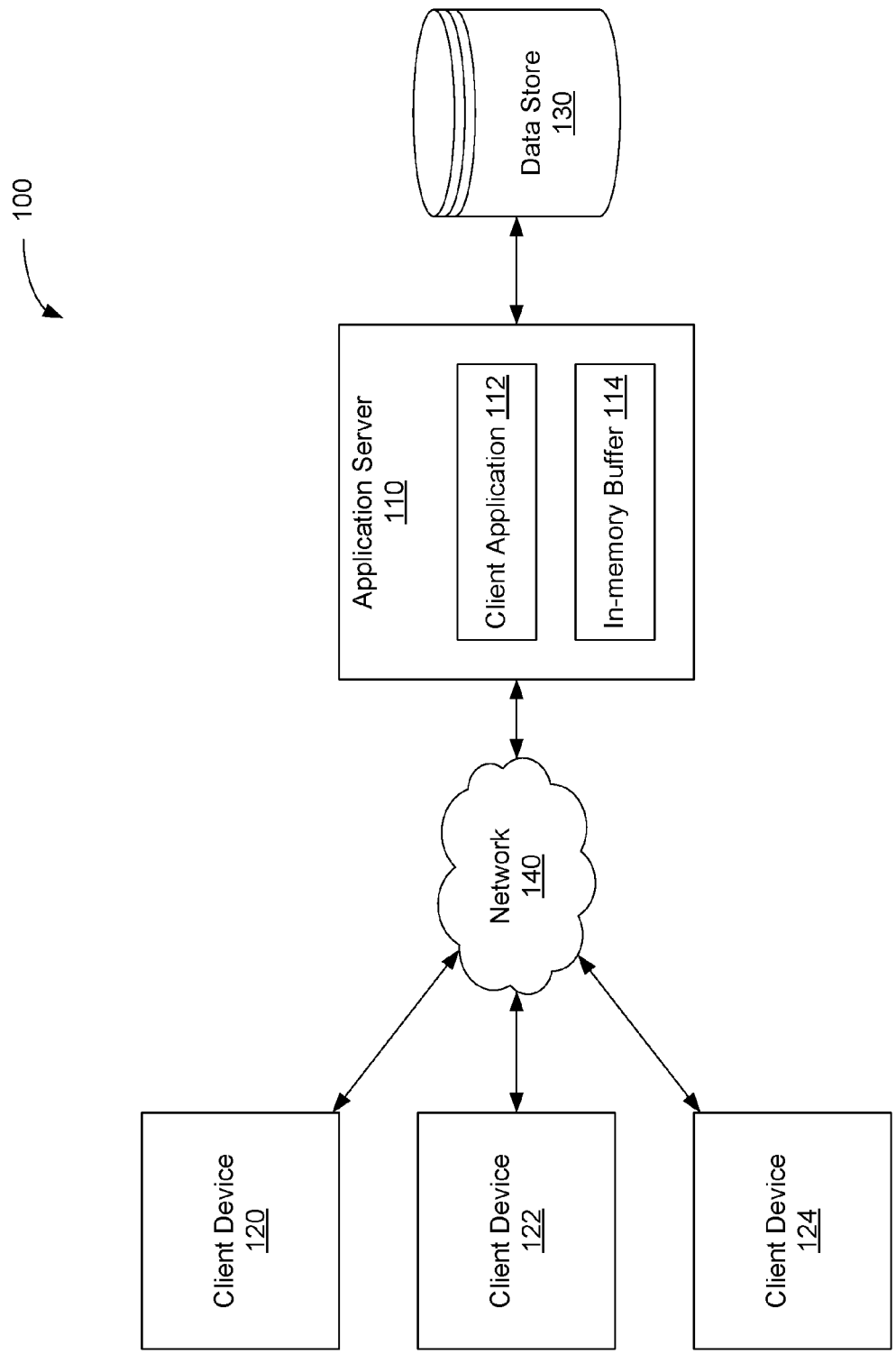
FIG. 1 is a block diagram illustrating a computing environment with an in-memory buffer service, according to an embodiment.

Embodiments are described for an in-memory buffer service. In certain high volume event systems, it may be beneficial to ingest and process events as quickly and efficient as possible (i.e., in real-time). Depending on the implementation, this may include ingesting, processing, and persisting potentially millions of events over the span of an hour or billions of events over the span of a week. For instance, a certain system may store up to a week's worth of details from sets of operations that are executed as a single unit (e.g., "Apex transactions") in an open source, non-relational, distributed database such as Apache HBase™, or other data store. This may be accomplished by pointing a debug log event handler that supplies limit usage information, or any other program or component that generates a high volume of events or other data elements to the data store. In other embodiments, some other data store may be used, such as a NoSQL database, a non-opensource database, a relational database, a non-distributed database, or other type of data store.

In an implementation that averages 7.3 billion Apex executions per month (or 243 million per day) being stored in the data store, storing one row per transaction limit with 8 types of limits would require storing 58.4 billion rows per month or about 1.8 billion rows per day across an entire service. Thus, if only raw event data were kept around for a week, that would require 13.1 billion rows at a time before being deleted. In other implementations, there may be up to 15 types of limits, which would result in even more rows being stored. This high volume situation could benefit significantly from a new way for handling event data at scale with high throughput.

In one embodiment, an in-memory buffer service running on a multi-tenant application server provides a low latency application program interface (API) that writes objects, such as event records, to the data store. In other embodiments, the application server may not server multiple clients, but rather is utilized by a single client that generates significant a volume of event data. The in-memory buffer service provides a "store and forward" based service for data objects, where those objects (e.g., events) are temporarily stored in an in-memory bounded buffer before being forward to a data store for longer term storage. A capture service can store events in a bounded buffer, where they may be kept in memory until the number of objects reaches a predefined limit, or the events have been in memory for a predetermined period of time (e.g., 5 seconds, 10 seconds, 30 seconds, 1 minute, etc.). The in-memory buffer provides a very low latency API to write objects and can be done very quickly. For instance, in some examples, writing the bounded buffer can be done in as little as 0.08 microseconds.

The in-memory buffer may be responsible for supporting a concurrently writable API, which enables the storing of events in memory and manages flushing of the buffer. In some embodiments, the in-memory buffer may include a plurality of buffer segments, where each segment is single threaded. Each segment can support high read consistency by waiting until all (or most) write threads are complete before read threads are initiated. Thus, each segment may only be read once. Additionally, the concurrent bounded buffer, comprised of segments, may be used to store events concurrently from various threads. The bounded buffer may also maintain a notion of load factor and may support two types of overflow policies. For example a buffer flush may be initiated when the buffer load reaches some predefined limit (e.g., 80% capacity). In some embodiments, the bounded buffer keeps the latest object by replacing an oldest object with a recent object (i.e., first in first out). In another embodiment, the bounded buffer drops the latest object if the buffer is full. A buffer flush regulator may further be used to regulate the flushing of the buffer. The regulating may be based on size and time, which will queue up the event for consumption and writing to the data store. For example the concurrent bounded buffer may provide a notification when the number of objects reaches a predefined limit that triggers buffer flushing.

Additionally, a consumer executor service is responsible for consuming the in-memory buffer and uses a dynamically sized thread pool to consume (i.e., process) the objects in parallel fashion in order to maximize throughput. The consumer executor service may include a service thread that initiates automatic restarts if a main thread is interrupted. The extension may also include an asynchronous API for starting and stopping a thread. The service thread further may use, in one implementation, Java's ThreadPool to get worker to run the consumer tasks concurrently and in a reliable manner. The service thread also may iteratively call blockedGetAndReset( ) API of the buffer and may assign a set of data to the consumer task. The consumer task may be eventually run by the ThreadPool's worker thread.

A consumer factory of the consumer executor service allows a user to customize a consumer task. A consumer task may first try to write to the data store (e.g., HBase™, Bigtable™, MongoDB™, etc.) directly in a given time in order to reduce the load on a message queue (MQ) and to make data available instantaneously. If writing to the data store fails, however, the consumer task may enqueue objects in the MQ, which eventually writes the objects to the data store via an MQ Handler. In some embodiments, a shutdown hook is used to close the service properly when a shutdown of the application server is requested. A log of statistics may also be kept, and the consumer executor service may be restarted if it was terminated for unknown reasons.

I. In-Memory Buffer Service

FIG. 1 is a block diagram illustrating a computing environment with an in-memory buffer service, according to an embodiment. In one embodiment, network environment 100 includes application server 110, client devices 120, 122, 124 and data store 130. Application server 110 and client devices 120, 122, 124 may be connected through a series of one or more networks 140, which may be, for example, a local area network (LAN), a wide area network (WAN), a global area network (GAN) such as the Internet, or a combination of such networks. In another embodiment, application server 110 and client devices 120, 122, 124 may have a direct connection to each of the other devices in the network. The illustrated embodiment shows one application server 110, and three client devices 120, 122, 124; however, in other embodiments, there may be any number of servers or client devices, and environment 100 may include additional and/or different components.

Each of client devices 120, 122, 124 may be, for example, a personal computer (PC), workstation, laptop computer, tablet computer, mobile phone, smartphone, personal digital assistant (PDA) or the like. Client devices 120, 122, 124 may communicate with application server 110 to access resources on application server, such as client application 112. For example a user may access client application 112 through a web browser or other HTTP client application on the client device.

In one embodiment, application server 110 may be any computing device, such as computing system 800, described below with respect to FIG. 8. In one embodiment, application server 110 may be a multi-tenant application server designed to provide access to a number of client applications, such as client application 112, to one more client devices, such as client devices 120, 122, 124. In another embodiment, application server 110 may be a single-tenant application server design to service a single client. Client application 112 and other resources provided by application server 110, such as processing resources, storage resources, etc., may be maintained by application server 110 and made available to the users of client devices 120, 122, 124 as needed (i.e., "on-demand"). This application server 110 can include various elements of hardware and software of a database system may be shared by one or more customers or tenants. For example, application server 110 may simultaneously process requests for a great number of customers. Application server 110 may include an application platform including a framework that allows the applications to execute, such as the hardware or software infrastructure of the system. In one embodiment, the application platform enables the creation, management and execution of one or more applications, such as client application 122, developed by the provider of the application server, customers accessing the application server 110 via client devices 120, 122, 124, or third party application developers.

In one embodiment, application server 110 includes in-memory buffer service 114. In-memory buffer service 114 can ingest and process events generated by client application 112, buffer those events and eventually store the events in data store 130. In one embodiment, data store 130 provides an application programming interface (API) which can be called by the in-memory buffer service 114 in order to store the events in data store 130. In one embodiment, data store 130 may be an open source, non-relational, distributed database such as Apache HBase™, Bigtable™, MongoDB™, or other data store. Examples of events generated by client application 112 may include errors, exceptions, faults, failures, crashes, incidents, or other occurrences. For example, client application 112 may include a user interface layer that presents a user interface visible on one of client devices 120, 122, 124. Through selection of a user interface element, the user may initiate some processing operation in a logical layer of the client application that hits some hard limit defined by the application server 110 (e.g., number of processing cycles consumed per day, amount of storage resources consumed) and page rendering is stopped. The reaching of this hard limit may trigger the creation of an event by client application 112 which is recorded for possible future review. The volume at which such events are potentially generated and conventional means for recording and storing these events may result in an unacceptable level of latency. As such, in one embodiment, in-memory buffer service 114 can ingest and process the events, buffer the events and eventually store the events in data store 130. The buffering of the events in memory before storage in data store 130 can allow a high volume of events to be processed in near real-time with minimal latency and without adversely affecting performance of the application server 110 or client application 112. Additional details of the in-memory buffer service 114 are provided below.

Figure 2:
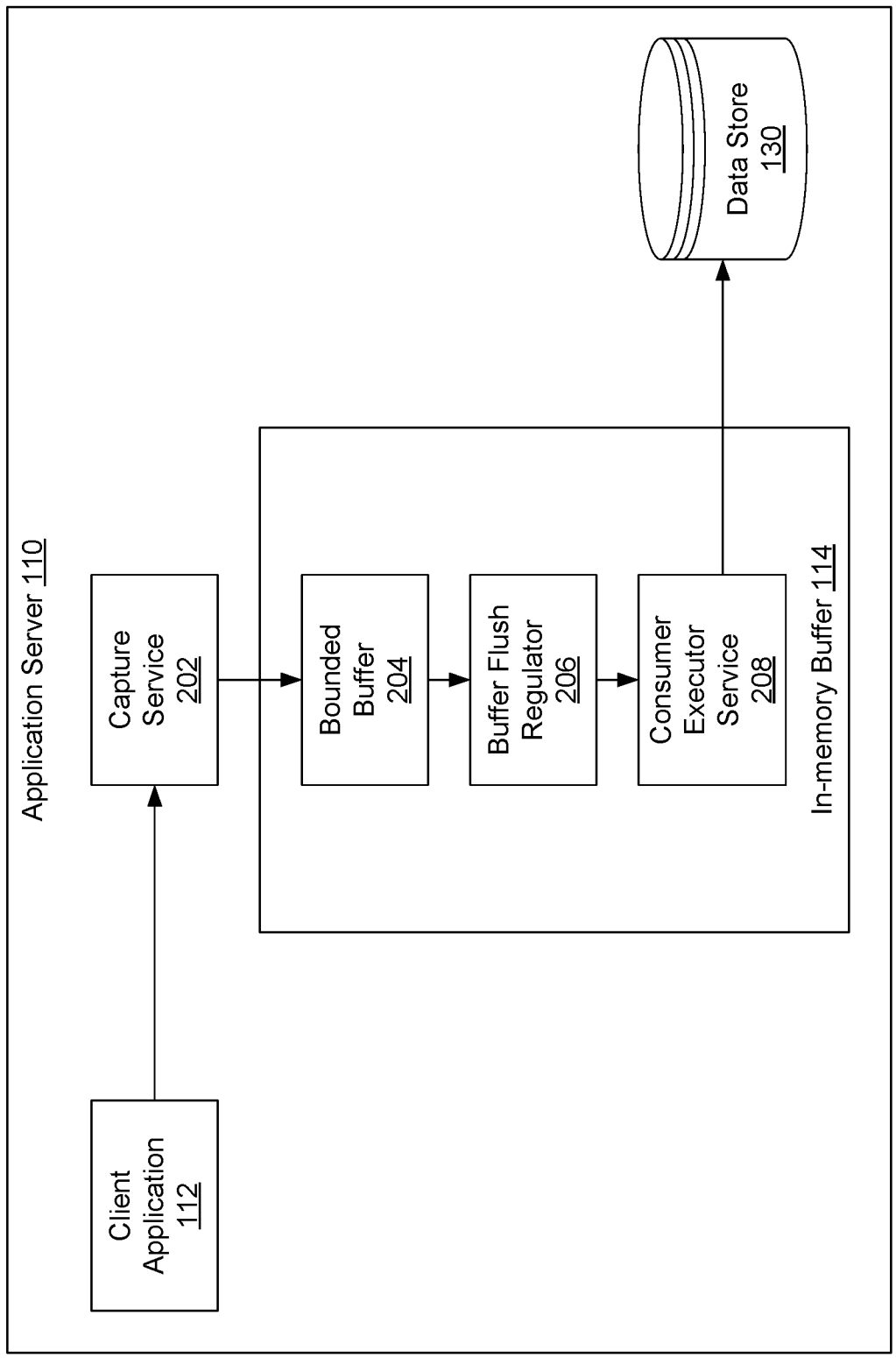
FIG. 2 is a block diagram illustrating an application server with an in-memory buffer service, according to an embodiment.

FIG. 2 is a block diagram illustrating an application server with an in-memory buffer service, according to an embodiment. As described above, application server 110 may include client application 112, in-memory buffer service 114 and data store 130. In one embodiment, data store 130 may be internal to application server 110. In another embodiment, data store 130 may be external to application server 110 and may be connected to application server 110 over a network or other connection. In other embodiments, application server 110 may include different and/or additional components which are not shown in order to simplify the description. In one embodiment, data store 130 may be embodied by one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

Client application 112 may be any type of computer application program that generates events. For example, client application 112 may be an entertainment application, productivity application, business application, social networking application or other types of application. In one embodiment, in-memory buffer 114 processes events for storage in data store 130. In other embodiments, in-memory buffer 114 may process any other type of data object for storage in data store 130 or elsewhere. In one embodiment, a capture service 202 running on application server 110 receives events from client application 112 that are to be stored in data store 130. Capture service 202 temporarily stores the received events in bounded buffer 204. The bounded buffer 204 may include a plurality of single-threaded segments, to which the capture service 202 can write the events in parallel. In one embodiment, bounded buffer 204 may include 16 single-threaded segments, each of which can be written in parallel with a different event generated by client application 112. The size of bounded buffer 204 is configurable according to the particular implementation. In one embodiment, the buffer size may be approximately 10 megabytes (MB) to 20 MB. In other embodiments, the buffer may have a different size, such as 1 MB, 50-100 MB, 1 terabye (TB), etc.).

In one embodiment, in-memory buffer service 114 further includes a buffer flush regulator 206. Buffer flush regulator 206 controls when bounded buffer 204 is emptied (i.e., "flushed") for consumption by consumer executor service 208 and storage in data store 130. In one embodiment, logic associated with bounded buffer 204 monitors the load on bounded buffer 204 and provides a notification to the buffer flush regulator 206 when the number of events stored in the bounded buffer 204 reaches a predefined limit (e.g., 80% full) or when a predefined amount of time has passed since a contents of the bounded buffer 204 was written to data store 130 (e.g., 10 seconds). In one embodiment, consumer executor service 208 periodically sends a request for buffer flushing to buffer flush regulator 206. Buffer flush regulator 206 determines whether a notification has been received from bounded buffer 204 indicating that either the predefined size limit or the predefined time limit has been reached. If not, buffer flush regulator 206 denies the request. If the notification has been received, buffer flush regulator 206 grants the request and consumer executor service 208 may consume the events in the bounded buffer 204 using a dynamically sized thread pool of consumer threads to read the segments of the bounded buffer 204 in parallel. By consuming the events, consumer executor service 208 reads the events from bounded buffer 204 and writes the events to data store 130.

In some situations, all of the segments of bounded buffer 204 may be filled with events and new events are received by capture service 202 before buffer flush regulator 206 can empty the contents of bounded buffer 204. Bounded buffer 204 may handle this situation in a number of different ways according to a defined overflow policy. In one embodiment, bounded buffer 204 may implement a "keep latest" overflow policy where the oldest event in bounded buffer 204 is overwritten with the newly received event from client application 112. In another embodiment, bounded buffer 204 may implement a "drop latest" overflow policy, where the newly received event is prevented from being stored in bounded buffer 204.

Figure 3:
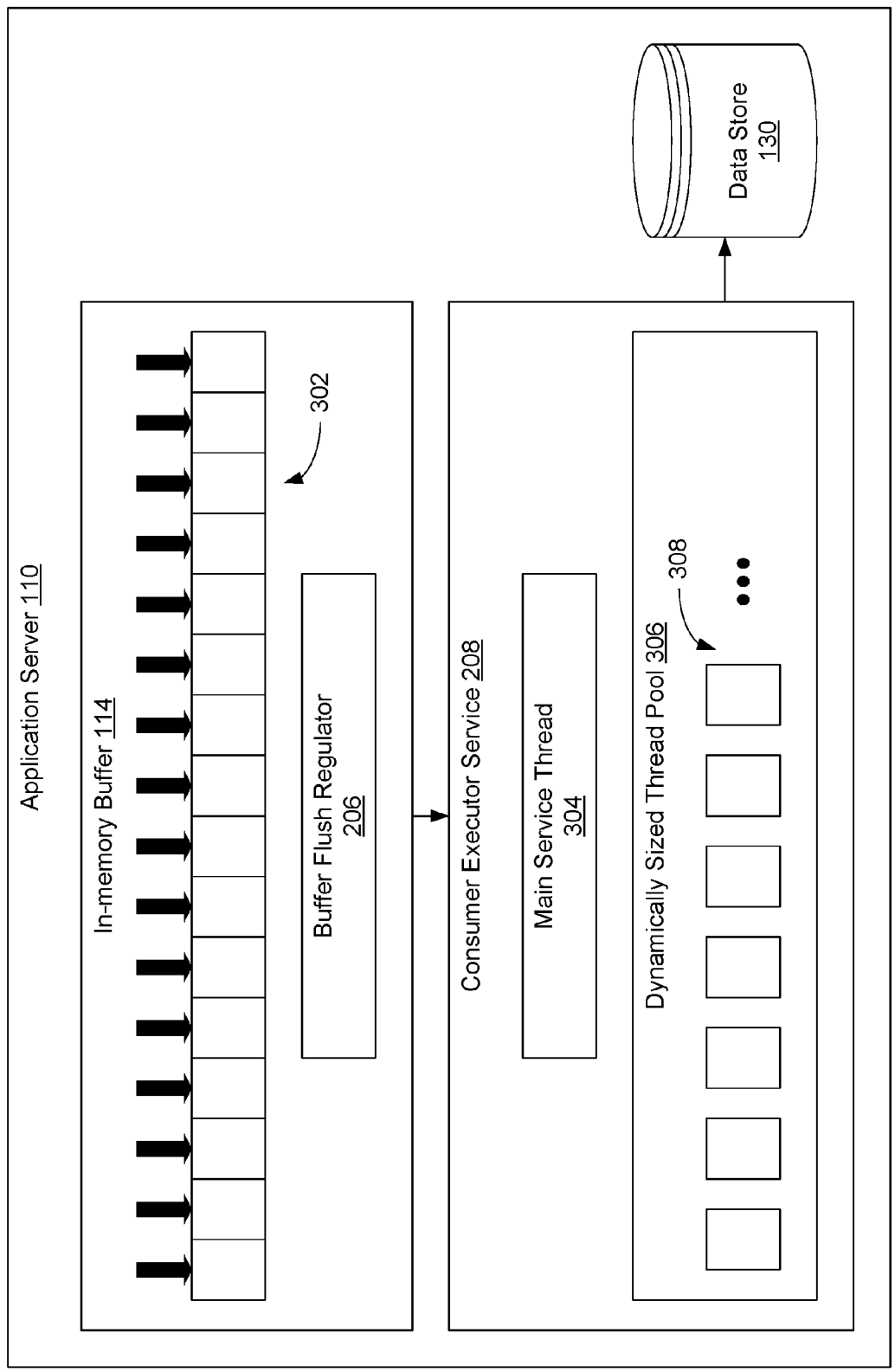
FIG. 3 is a block diagram illustrating an application server with an in-memory buffer service, according to an embodiment.

FIG. 3 is a block diagram illustrating an application server with an in-memory buffer service, according to an embodiment. In one embodiment, application server 110 includes in-memory buffer service 114 and consumer executor service 208. In one embodiment, consumer executor service 208 may be part of in-memory buffer service 114; however, in another embodiment, consumer executor service 208 may be a separate, standalone, service. In one embodiment, an in-memory bounded buffer utilized by the in-memory buffer service 114 includes a plurality of single-threaded segments 302, to which capture service 202 can write the events in parallel. In one embodiment, the bounded buffer may include 16 single-threaded segments 302, each of which can be written in parallel with a different event or other data object. In other embodiments, the bounded buffer may have some other number of segments, including more or less than 16 segments.

In one embodiment, in-memory buffer service 114 further includes buffer flush regulator 206. Buffer flush regulator 206 controls when bounded buffer 204 is emptied (i.e., "flushed") for consumption by consumer executor service 208 and storage in data store 130. In one embodiment, in-memory buffer service 114 monitors the load on the buffer segments 302 and provides a notification to the buffer flush regulator 206 when a certain portion or percentage of the buffer segments 302 are full (e.g., 80% full) or when a predefined amount of time has passed since a contents of the buffer segments 302 were flushed (e.g., 10 seconds). In one embodiment, a main service thread 304 in consumer executor service 208 may periodically send a request for buffer flushing to buffer flush regulator 206. Buffer flush regulator 206 may determine whether a notification has been received from bounded buffer 204 indicating that either the predefined size limit or the predefined time limit have been reached. If not, buffer flush regulator 206 denies the request. If the notification has been received, buffer flush regulator 206 grants the request and consumer executor service 208 may consume the events in the bounded buffer 204 using a dynamically sized thread pool 306 of consumer threads 308 to read the segments of the bounded buffer 204 in parallel. Dynamically sized thread pool 306 can add or remove consumer threads 308 so that the number of consumer threads 308 matches the number of buffer segments 302 being consumed. For example, if all 16 segments 302 are being read, dynamically sized thread pool 306 can have 16 consumer threads 308. If, however, only 10 buffer segments 302 contain events, then thread pool 306 need only include 10 threads 308. The consumer threads 308 read the events from buffer segments 302 in parallel and write the events to data store 130.

Figure 4:
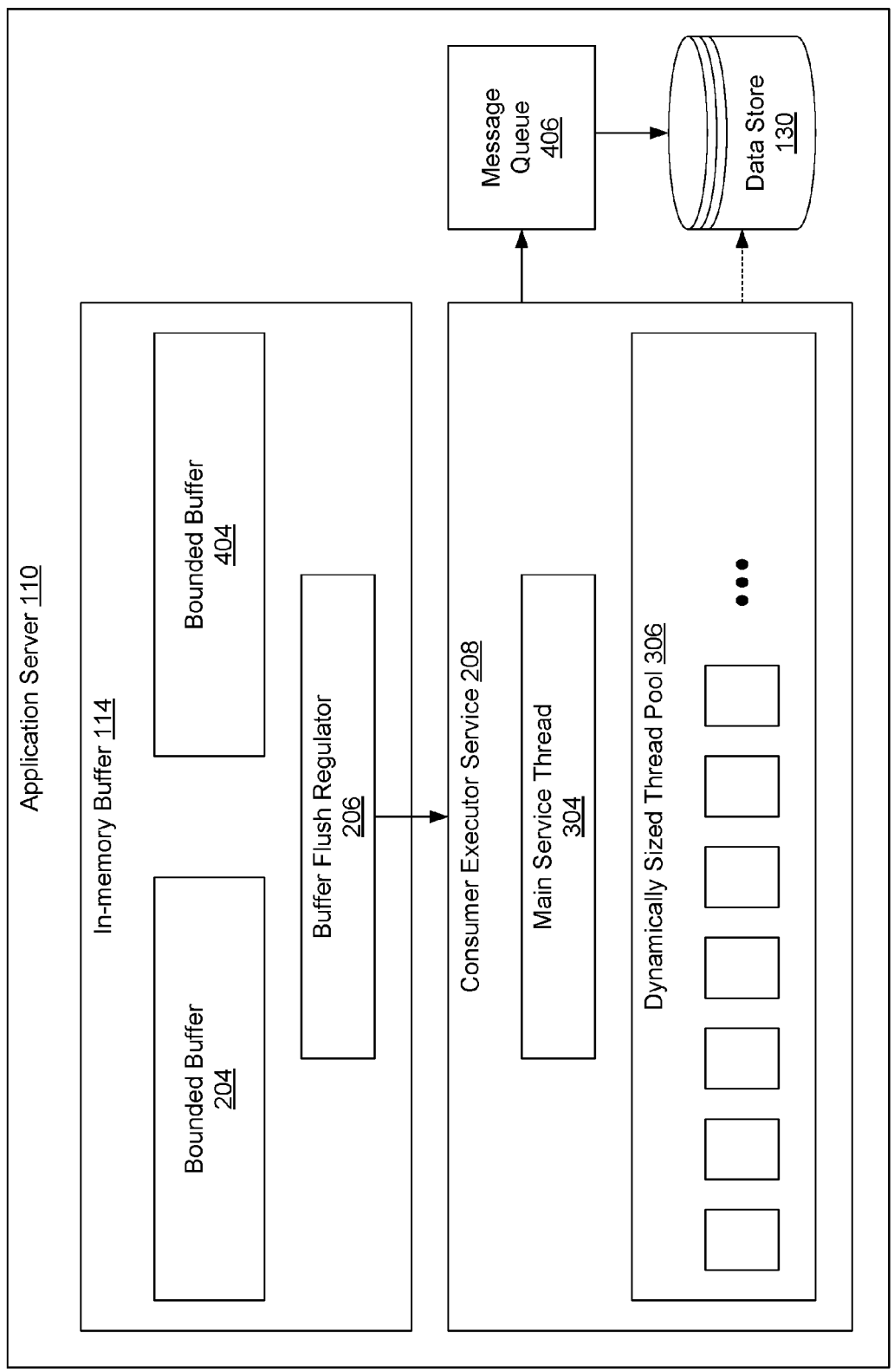
FIG. 4 is a block diagram illustrating an application server with dual in-memory bounded buffers, according to an embodiment.

FIG. 4 is a block diagram illustrating an application server with dual in-memory bounded buffers, according to an embodiment. In one embodiment, application server 110 includes in-memory buffer service 114 and consumer executor service 208. In one embodiment, in-memory buffer service 114 utilizes two or more bounded buffers 204, 404 to buffer events received from a client application. In one embodiment, each bounded buffer 204, 404 may include a plurality of single-threaded segments, each of which can be written in parallel with a different event or other data object. The dual bounded buffers 204, 404 can be used alternately to prevent a service interruption. For example, once bounded buffer 204 has been filled with event data and is in the process of being flushed by consumer executor service 208, additional events may be received from the client application or other source. Since bounded buffer 204 is not available, those new events cannot be stored in bounded buffer 204. Instead, bounded buffer 404 may be utilized to store the newly received events. Bounded buffer 404 can function as the current buffer, storing new events until it is ready to be flushed. Buffer flush regulator 206 can initiate a flush of bounded buffer 404 using the same conditions described above with respect to bounded buffer 204. Once bounded buffer 404 is flushed, in-memory buffer service 114 can return to using bounded buffer 204 as the current buffer. The process can repeat, alternating between the available buffers to prevent service interruption and the loss of any event data. In other embodiments, there may be more than two bounded buffers which are cycled through in a similar fashion. For example, a given server, may have three, four, or more buffers available. In one embodiment, a server may initially have some number of buffers (e.g., two), but additional buffers may be allocated as the need arises. Thus, if event data is being received at a rate that cannot be serviced using the current number of buffers, the in-memory buffer service or other logic may allocate additional buffers in order to accommodate the higher volume of events.

Under normal operation the threads of the dynamically sized thread pool 306 in consumer executor service 208 may write the events read from either bounded buffer 204 or bounded buffer 404 directly to data store 130. Depending on the implementation, however, the data store 130 may be a distributed system and possibly take a significant period of time to be written. In such a case, or if all or a portion of the data store 130 is temporarily unavailable, consumer executor service 208 may enqueue the events from the bounded buffer 204 or 404 in a message queue 406 for subsequent writing to data store 130 after data store 130 becomes available. In one embodiment, consumer executor service 208 may first try to write directly to data store 130, but if data store 130 does not respond within some period of time, message queue 406 may be utilized. Message queue 406 may be any available in-memory or out-of-memory data structure that can temporarily accommodate the events before they are stored in data store 130. In one embodiment, message queue 406 may be large enough to store the contents of one bounded buffer 204 at a time. In another embodiment, message queue 406 may be large enough to store the contents of multiple buffers concurrently.

Figure 5:
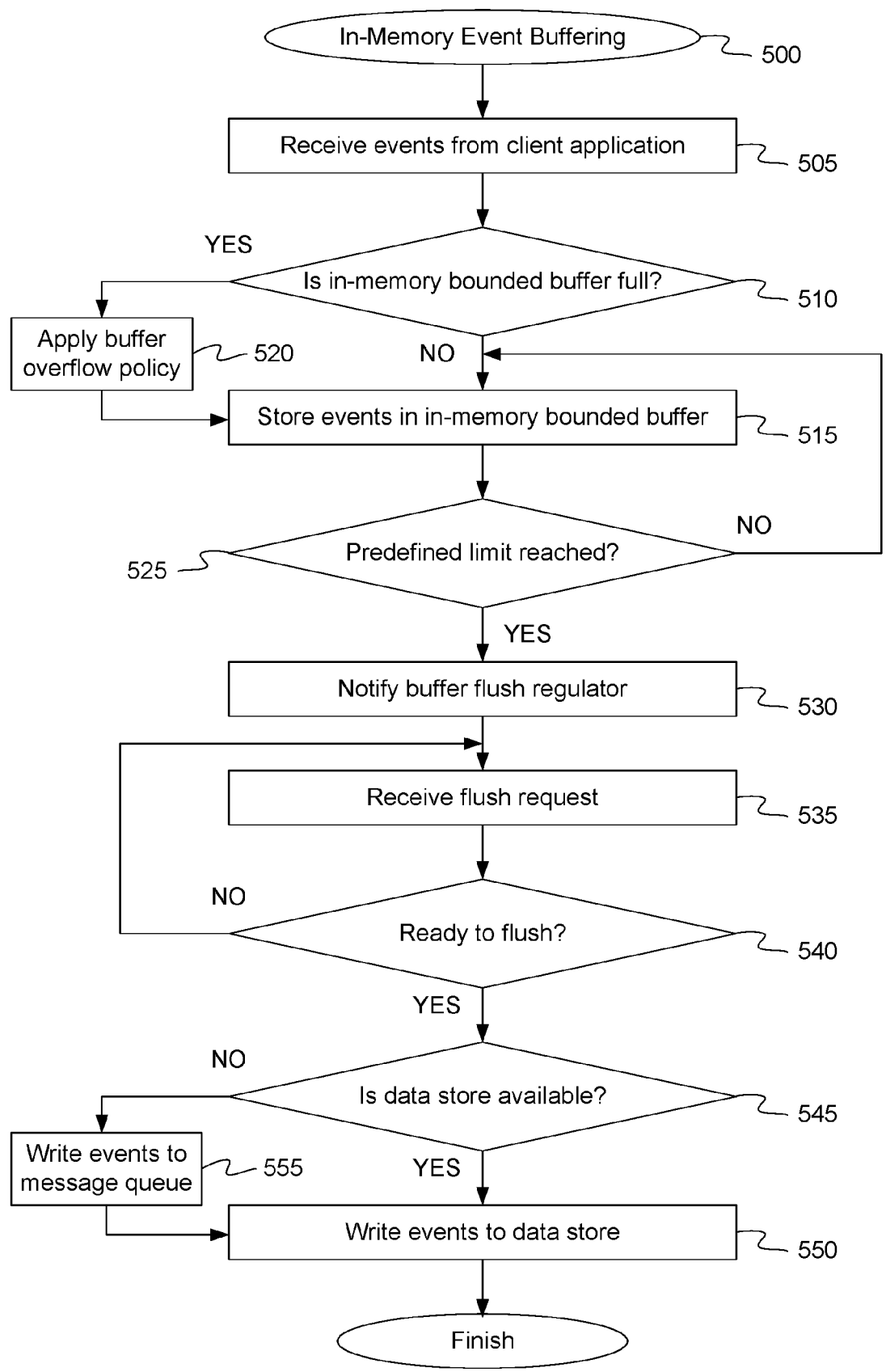
FIG. 5 is a flow diagram illustrating a method for in-memory buffering of event data, according to an embodiment.

FIG. 5 is a flow diagram illustrating a method for in-memory buffering of event data, according to an embodiment. The method 500 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to receive event data for storage in a data store and buffer the event data in an in-memory bounded buffer prior to storage in the data store. In one embodiment, method 500 may be performed by in-memory buffer service, as shown in FIGS. 1-4.

Referring to FIG. 5, at block 505, method 500 receives events from client application 112. In one embodiment, a capture service 202 running on application server 110 receives events from client application 112 that are to be stored in data store 130. In another embodiment, capture service 202 may receive generic data objects from some other source for in-memory buffering.

At block 510, method 500 determines whether in-memory bounded buffer 204 is full. In one embodiment, bounded buffer 204 may include 16 single-threaded segments, each of which can be written in parallel with a different event generated by client application 112. In one embodiment, in-memory buffer service 114 determines whether each of the buffer segments has been written with an event. If each segment contains an event, then in-memory buffer service 114 determines that the bounded buffer 204 is full. If there are one or more segments of the bounded buffer 204 that do not contain events, then in-memory buffer service 114 determines that the bounded buffer 204 is not full.

If in-memory bounded buffer 204 is not full, at block 515, method 500 stores the received events in the in-memory bounded buffer 204. In one embodiment, capture service 202 writes the received events to one or more of the segments 302 of in-memory bounded buffer 204 in parallel.

If in-memory bounded buffer 204 is full, at block 520, method 500 applies a buffer overflow policy prior to storing the events. In one embodiment, bounded buffer 204 may implement a "keep latest" overflow policy where the oldest event in bounded buffer 204 is overwritten with the newly received event from client application 112. In another embodiment, bounded buffer 204 may implement a "drop latest" overflow policy, where the newly received event is prevented from being stored in bounded buffer 204.

At block 525, method 500 determines if a predefined limit has been reached. In one embodiment, in-memory buffer service 114 monitors the load on bounded buffer 204 and determines when the number of events stored in the bounded buffer 204 reaches a predefined limit (e.g., 80% full) or when a predefined amount of time has passed since a contents of the bounded buffer 204 was written to data store 130 (e.g., 10 seconds). If the predefined limit has been reached, at block 530, method 500 provides a notification to buffer flush regulator 206. In one embodiment, in-memory buffer service 114 provides the notification to buffer flush regulator 206.

At block 535, method 500 receives a buffer flush request from consumer executor service 208. In one embodiment, consumer executor service 208 may periodically send a request for buffer flushing to buffer flush regulator 206. The period with which the request is sent can be configurable depending on the particular implementation.

At block 540, method 500 determines whether the in-memory bounded buffer 204 is ready to be flushed. Buffer flush regulator 206 may determine whether a notification has been received from bounded buffer 204, at block 530, indicating that either the predefined size limit or the predefined time limit have been reached. If not, buffer flush regulator 206 denies the request.

If the in-memory bounded buffer 204 is ready to be flushed, at block 545, method 500 determines whether the data store 130 is available. Depending on the implementation, the data store 130 may be a distributed system and possibly take a significant period of time to be written. In such a case, all or a portion of the data store 130 may be temporarily unavailable.

If the data store 130 is available, at block 550, method 500 consumes the events from the in-memory bounded buffer 204 by writing the events directly to the data store 130. In one embodiment, consumer executor service 208 may consume the events in the bounded buffer 204 using a dynamically sized thread pool of consumer threads to read the segments of the bounded buffer 204 in parallel. By consuming the events, consumer executor service 208 reads the events from bounded buffer 204 and writes the events to data store 130.

If the data store is not available, at block 555, method 500 enqueues the events from in-memory bounded buffer 204 in a message queue 406 for subsequent writing to the data store 130 after the data store 130 becomes available. Message queue 406 may be any available in-memory or out-of-memory data structure that can temporarily accommodate the events before they are stored in data store 130. In one embodiment, message queue 406 may be large enough to store the contents of one bounded buffer 204 at a time. In another embodiment, message queue 406 may be large enough to store the contents of multiple buffers concurrently.

II. Example System Overview

The following description is of one example of a system in which the features described above may be implemented. The components of the system described below are merely one example and should not be construed as limiting. The features described above with respect to FIGS. 1-5 may be implemented in any other type of computing environment, such as one with multiple servers, one with a single server, a multi-tenant server environment, a single-tenant server environment, or some combination of the above.

Figure 6A:
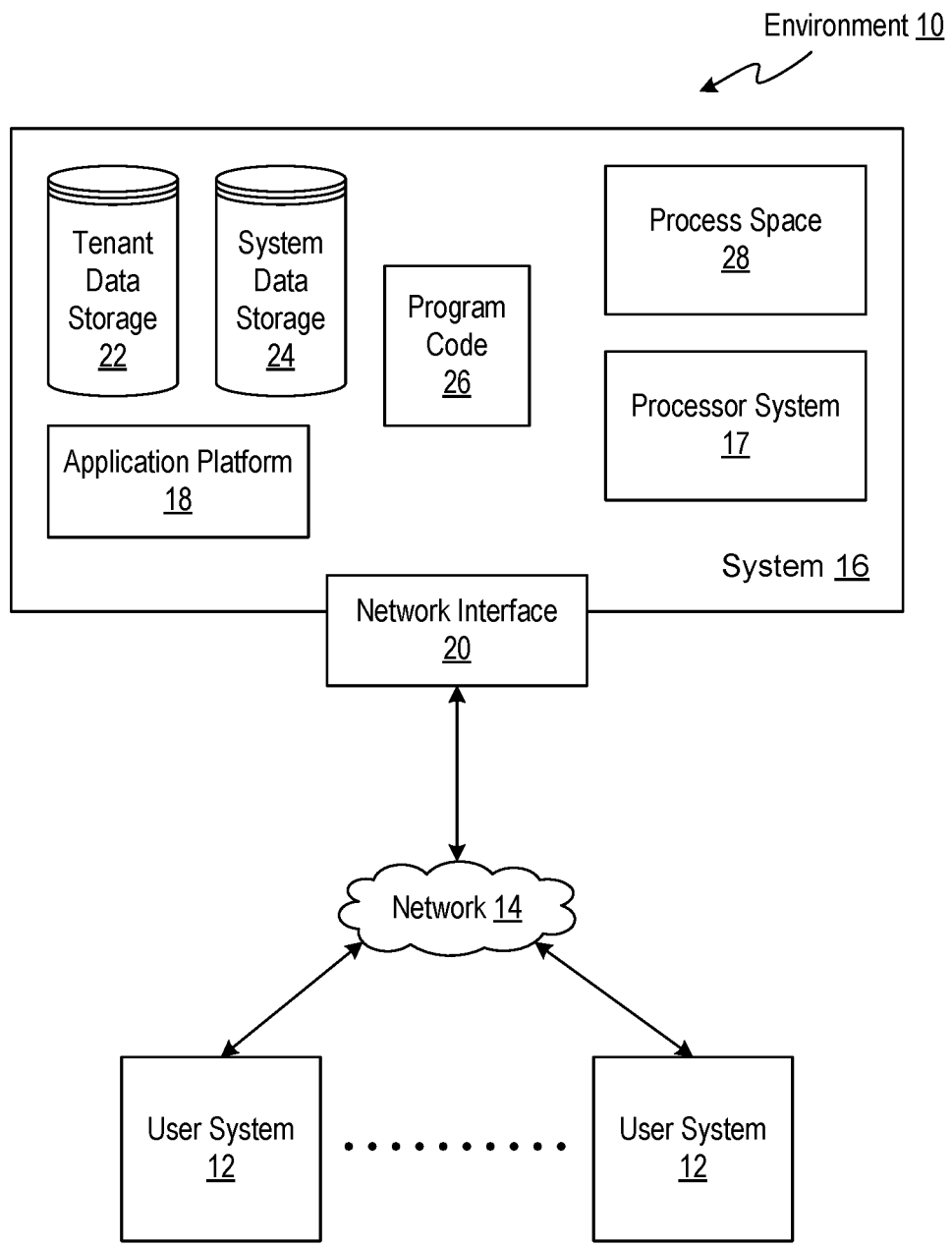
FIG. 6A shows a block diagram of an example environment in which an on-demand database service can be used in accordance with some embodiments.

FIG. 6A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 6B:
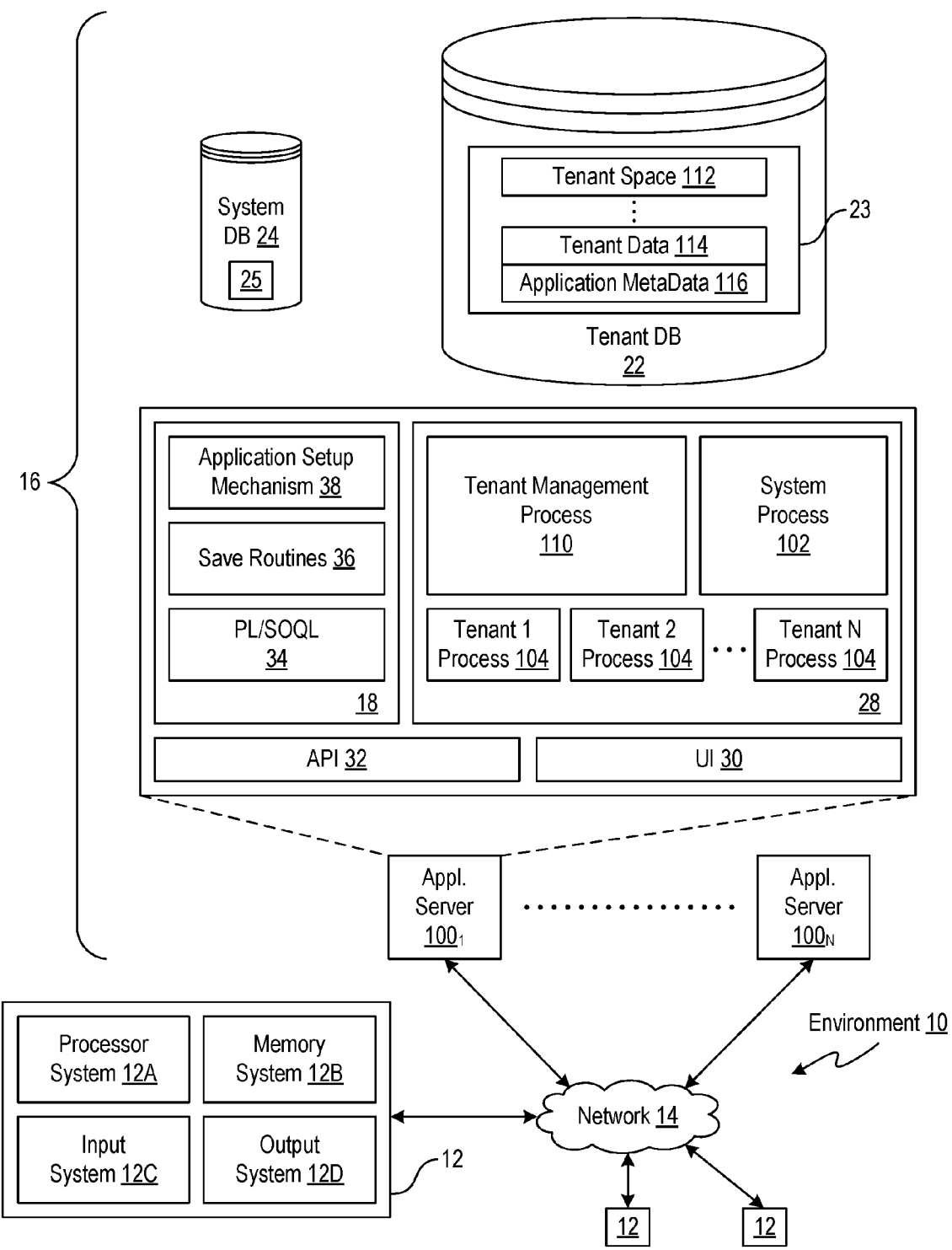
FIG. 6B shows a block diagram of example implementations of elements of FIG. 1A and example interconnections between these elements according to some embodiments.

FIG. 6B shows a block diagram of example implementations of elements of FIG. 6A and example interconnections between these elements according to some implementations. That is, FIG. 6B also illustrates environment 10, but FIG. 6B, various elements of the system 16 and various interconnections between such elements are shown with more specificity according to some more specific implementations. Additionally, in FIG. 6B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 6B, the network interface 20 is implemented as a set of HTTP application servers $100_1$-$100_N$. Each application server 800, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 812, which can be physically or logically arranged or divided. Within each tenant storage space 812, user storage 814 and application metadata 816 can similarly be allocated for each user. For example, a copy of a user's most recently used (MRU) items can be stored to user storage 814. Similarly, a copy of MRU items for an entire organization that is a tenant can be stored to tenant storage space 812.

The process space 28 includes system process space 802, individual tenant process spaces 804 and a tenant management process space 810. The application platform 18 includes an application setup mechanism 38 that supports application developers' creation and management of applications. Such applications and others can be saved as metadata into tenant database 22 by save routines 36 for execution by subscribers as one or more tenant process spaces 804 managed by tenant management process 810, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 816 for the subscriber making the invocation and executing the metadata as an application in a virtual machine.

The system 16 of FIG. 6B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 800 can be communicably coupled with tenant database 22 and system database 24, for example, having access to tenant data 23 and system data 25, respectively, via a different network connection. For example, one application server $800_1$ can be coupled via the network 14 (for example, the Internet), another application server $800_{N-1}$ can be coupled via a direct network link, and another application server $800_N$ can be coupled by yet a different network connection. Transfer Control Protocol and Internet Protocol (TCP/IP) are examples of typical protocols that can be used for communicating between application servers 800 and the system 16. However, it will be apparent to one skilled in the art that other transport protocols can be used to optimize the system 16 depending on the network interconnections used.

In some implementations, each application server 800 is configured to handle requests for any user associated with any organization that is a tenant of the system 16. Because it can be desirable to be able to add and remove application servers 800 from the server pool at any time and for various reasons, in some implementations there is no server affinity for a user or organization to a specific application server 800. In some such implementations, an interface system implementing a load balancing function (for example, an F5 Big-IP load balancer) is communicably coupled between the application servers 800 and the user systems 12 to distribute requests to the application servers 800. In one implementation, the load balancer uses a least-connections algorithm to route user requests to the application servers 800. Other examples of load balancing algorithms, such as round robin and observed-response-time, also can be used. For example, in some instances, three consecutive requests from the same user could hit three different application servers 800, and three requests from different users could hit the same application server 800. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 800 to request and update system-level and tenant-level data from the system 16. Such requests and updates can involve sending one or more queries to tenant database 22 or system database 24. The system 16 (for example, an application server 800 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 7A:
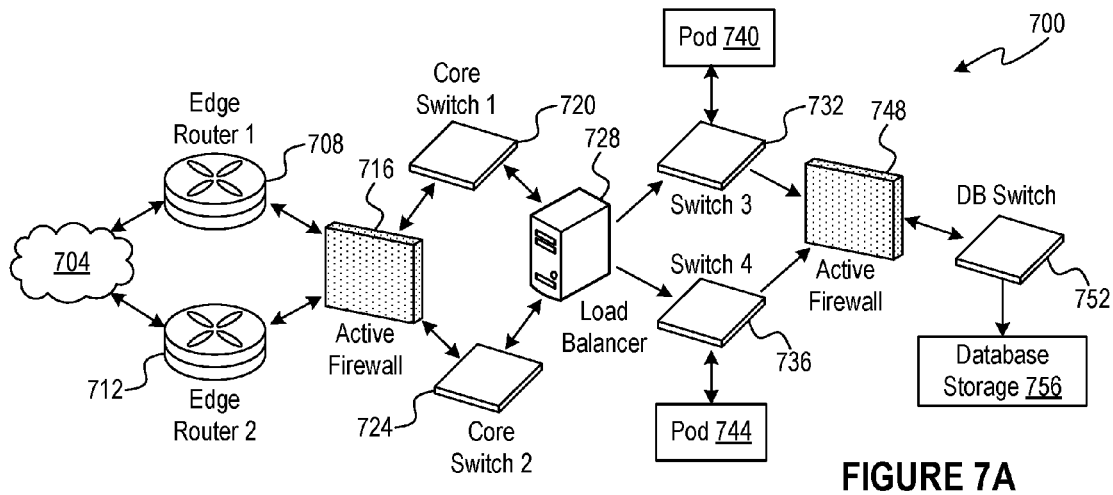
FIG. 7A shows a system diagram of example architectural components of an on-demand database service environment according to some embodiments.

FIG. 7A shows a system diagram illustrating example architectural components of an on-demand database service environment 700 according to some implementations. A client machine communicably connected with the cloud 704, generally referring to one or more networks in combination, as described herein, can communicate with the on-demand database service environment 700 via one or more edge routers 708 and 712. A client machine can be any of the examples of user systems 12 described above. The edge routers can communicate with one or more core switches 720 and 724 through a firewall 716. The core switches can communicate with a load balancer 728, which can distribute server load over different pods, such as the pods 740 and 744. The pods 740 and 744, which can each include one or more servers or other computing resources, can perform data processing and other operations used to provide on-demand services. Communication with the pods can be conducted via pod switches 732 and 736. Components of the on-demand database service environment can communicate with database storage 756 through a database firewall 748 and a database switch 752.

Figure 7B:
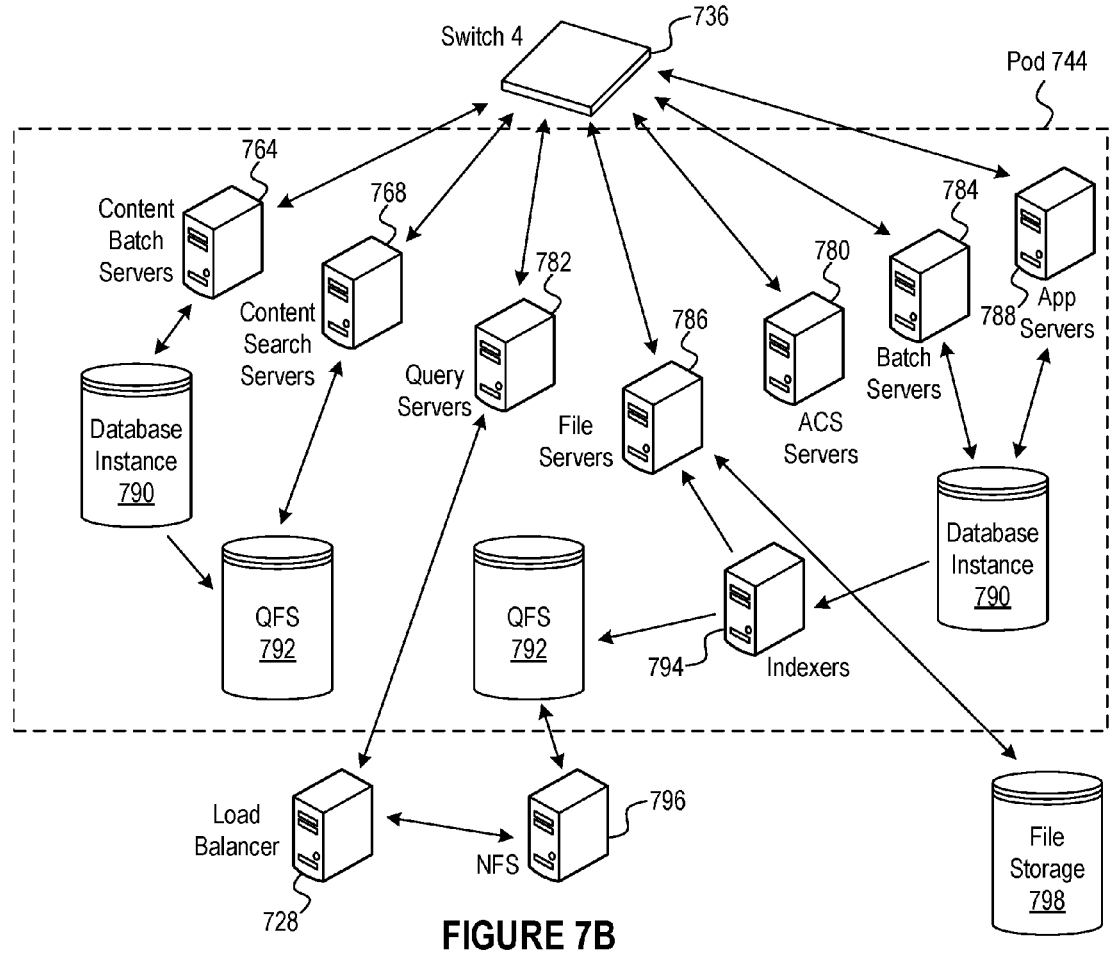
FIG. 7B shows a system diagram further illustrating example architectural components of an on-demand database service environment according to some embodiments.

As shown in FIGS. 7A and 7B, accessing an on-demand database service environment can involve communications transmitted among a variety of different hardware or software components. Further, the on-demand database service environment 700 is a simplified representation of an actual on-demand database service environment. For example, while only one or two devices of each type are shown in FIGS. 7A and 7B, some implementations of an on-demand database service environment can include anywhere from one to several devices of each type. Also, the on-demand database service environment need not include each device shown in FIGS. 7A and 7B, or can include additional devices not shown in FIGS. 7A and 7B.

Additionally, it should be appreciated that one or more of the devices in the on-demand database service environment 700 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 704 is intended to refer to a data network or multiple data networks, often including the Internet. Client machines communicably connected with the cloud 704 can communicate with other components of the on-demand database service environment 700 to access services provided by the on-demand database service environment. For example, client machines can access the on-demand database service environment to retrieve, store, edit, or process information. In some implementations, the edge routers 708 and 712 route packets between the cloud 704 and other components of the on-demand database service environment 700. For example, the edge routers 708 and 712 can employ the Border Gateway Protocol (BGP). The BGP is the core routing protocol of the Internet. The edge routers 708 and 712 can maintain a table of IP networks or 'prefixes', which designate network reachability among autonomous systems on the Internet.

In some implementations, the firewall 716 can protect the inner components of the on-demand database service environment 700 from Internet traffic. The firewall 716 can block, permit, or deny access to the inner components of the on-demand database service environment 700 based upon a set of rules and other criteria. The firewall 716 can act as one or more of a packet filter, an application gateway, a stateful filter, a proxy server, or any other type of firewall.

In some implementations, the core switches 720 and 724 are high-capacity switches that transfer packets within the on-demand database service environment 700. The core switches 720 and 724 can be configured as network bridges that quickly route data between different components within the on-demand database service environment. In some implementations, the use of two or more core switches 720 and 724 can provide redundancy or reduced latency.

In some implementations, the pods 740 and 744 perform the core data processing and service functions provided by the on-demand database service environment. Each pod can include various types of hardware or software computing resources. An example of the pod architecture is discussed in greater detail with reference to FIG. 7B. In some implementations, communication between the pods 740 and 744 is conducted via the pod switches 732 and 736. The pod switches 732 and 736 can facilitate communication between the pods 740 and 744 and client machines communicably connected with the cloud 704, for example via core switches 720 and 724. Also, the pod switches 732 and 736 may facilitate communication between the pods 740 and 744 and the database storage 756. In some implementations, the load balancer 728 can distribute workload between the pods 740 and 744. Balancing the on-demand service requests between the pods can assist in improving the use of resources, increasing throughput, reducing response times, or reducing overhead. The load balancer 728 may include multilayer switches to analyze and forward traffic.

In some implementations, access to the database storage 756 is guarded by a database firewall 748. The database firewall 748 can act as a computer application firewall operating at the database application layer of a protocol stack. The database firewall 748 can protect the database storage 756 from application attacks such as structure query language (SQL) injection, database rootkits, and unauthorized information disclosure. In some implementations, the database firewall 748 includes a host using one or more forms of reverse proxy services to proxy traffic before passing it to a gateway router. The database firewall 748 can inspect the contents of database traffic and block certain content or database requests. The database firewall 748 can work on the SQL application level atop the TCP/IP stack, managing applications' connection to the database or SQL management interfaces as well as intercepting and enforcing packets traveling to or from a database network or application interface.

In some implementations, communication with the database storage 756 is conducted via the database switch 752. The multi-tenant database storage 756 can include more than one hardware or software components for handling database queries. Accordingly, the database switch 752 can direct database queries transmitted by other components of the on-demand database service environment (for example, the pods 740 and 744) to the correct components within the database storage 756. In some implementations, the database storage 756 is an on-demand database system shared by many different organizations as described above with reference to FIG. 6A and FIG. 6B.

FIG. 7B shows a system diagram further illustrating example architectural components of an on-demand database service environment according to some implementations. The pod 744 can be used to render services to a user of the on-demand database service environment 700. In some implementations, each pod includes a variety of servers or other systems. The pod 744 includes one or more content batch servers 764, content search servers 768, query servers 782, file force servers 786, access control system (ACS) servers 780, batch servers 784, and app servers 788. The pod 744 also can include database instances 790, quick file systems (QFS) 792, and indexers 794. In some implementations, some or all communication between the servers in the pod 744 can be transmitted via the switch 736.

In some implementations, the app servers 788 include a hardware or software framework dedicated to the execution of procedures (for example, programs, routines, scripts) for supporting the construction of applications provided by the on-demand database service environment 700 via the pod 744. In some implementations, the hardware or software framework of an app server 788 is configured to execute operations of the services described herein, including performance of the blocks of various methods or processes described herein. In some alternative implementations, two or more app servers 288 can be included and cooperate to perform such methods, or one or more other servers described herein can be configured to perform the disclosed methods.

The content batch servers 764 can handle requests internal to the pod. Some such requests can be long-running or not tied to a particular customer. For example, the content batch servers 764 can handle requests related to log mining, cleanup work, and maintenance tasks. The content search servers 768 can provide query and indexer functions. For example, the functions provided by the content search servers 768 can allow users to search through content stored in the on-demand database service environment. The file force servers 786 can manage requests for information stored in the File force storage 798. The File force storage 798 can store information such as documents, images, and basic large objects (BLOB s). By managing requests for information using the file force servers 786, the image footprint on the database can be reduced. The query servers 782 can be used to retrieve information from one or more file systems. For example, the query system 782 can receive requests for information from the app servers 788 and transmit information queries to the NFS 796 located outside the pod.

The pod 744 can share a database instance 790 configured as a multi-tenant environment in which different organizations share access to the same database. Additionally, services rendered by the pod 744 may call upon various hardware or software resources. In some implementations, the ACS servers 780 control access to data, hardware resources, or software resources. In some implementations, the batch servers 784 process batch jobs, which are used to run tasks at specified times. For example, the batch servers 784 can transmit instructions to other servers, such as the app servers 788, to trigger the batch jobs.

In some implementations, the QFS 792 is an open source file system available from Sun Microsystems® of Santa Clara, Calif. The QFS can serve as a rapid-access file system for storing and accessing information available within the pod 744. The QFS 792 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 768 or indexers 794 to identify, retrieve, move, or update data stored in the network file systems 796 or other storage systems.

In some implementations, one or more query servers 782 communicate with the NFS 796 to retrieve or update information stored outside of the pod 744. The NFS 796 can allow servers located in the pod 744 to access information to access files over a network in a manner similar to how local storage is accessed. In some implementations, queries from the query servers 782 are transmitted to the NFS 796 via the load balancer 728, which can distribute resource requests over various resources available in the on-demand database service environment. The NFS 796 also can communicate with the QFS 792 to update the information stored on the NFS 796 or to provide information to the QFS 792 for use by servers located within the pod 744.

In some implementations, the pod includes one or more database instances 790. The database instance 790 can transmit information to the QFS 792. When information is transmitted to the QFS, it can be available for use by servers within the pod 744 without using an additional database call. In some implementations, database information is transmitted to the indexer 794. Indexer 794 can provide an index of information available in the database 790 or QFS 792. The index information can be provided to file force servers 786 or the QFS 792.

Figure 8:
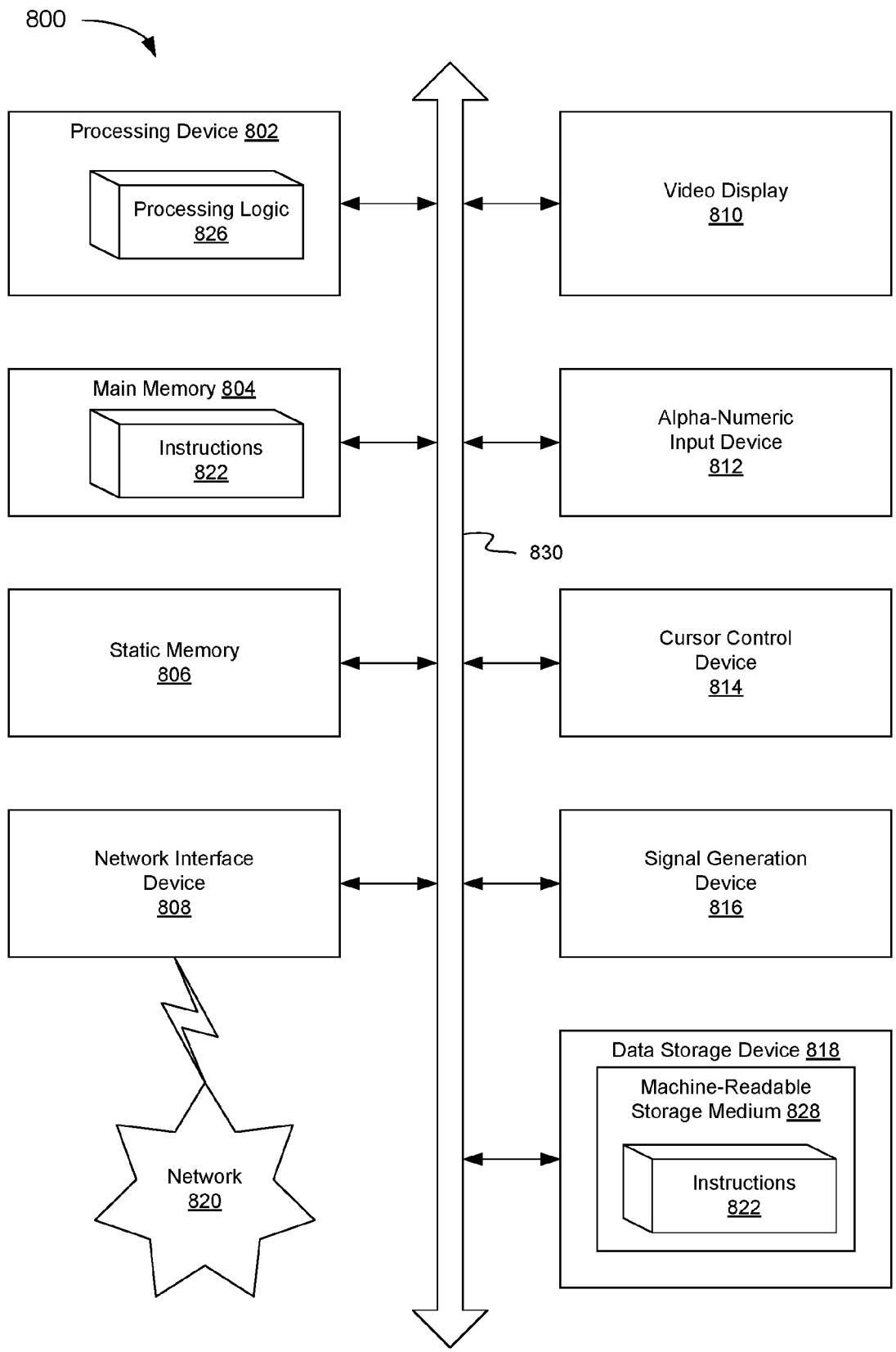
FIG. 8 is a block diagram illustrating an exemplary computer system, according to an embodiment.

FIG. 8 illustrates a diagrammatic representation of a machine in the exemplary form of a computer system 800 within which a set of instructions, for causing the machine to perform any one or more of the methodologies discussed herein, may be executed. The system 800 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 800 may represent application server 110, as shown in FIGS. 2-4.

The exemplary computer system 800 includes a processing device (processor) 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)), and a data storage device 818, which communicate with each other via a bus 830.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute the notification manager 210 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a computer-readable medium 828 on which is stored one or more sets of instructions 822 (e.g., instructions of in-memory buffer service 114) embodying any one or more of the methodologies or functions described herein. The instructions 822 may also reside, completely or at least partially, within the main memory 804 and/or within processing logic 826 of the processing device 802 during execution thereof by the computer system 800, the main memory 804 and the processing device 802 also constituting computer-readable media. The instructions may further be transmitted or received over a network 820 via the network interface device 808.

While the computer-readable storage medium 828 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving events from a client application running on an application server to be stored in a data store;
   storing the events in an in-memory bounded buffer on the application server, the in-memory bounded buffer comprising a plurality of single-threaded segments;
   providing a notification to a buffer flush regulator when a number of events stored in the in-memory bounded buffer reaches a predefined limit;
   receiving a request to flush the events from the in-memory bounded buffer; and
   consuming the events in the in-memory bounded buffer using a dynamically sized thread pool of consumer threads to read segments of the in-memory bounded buffer in parallel.

2. The method of claim 1, wherein the predefined limit comprises a percentage of the in-memory bounded buffer that is filled with events.

3. The method of claim 1, further comprising:
   providing the notification to the buffer flush regulator after a predefined amount of time has passed since a contents of the in-memory bounded buffer was written to the data store.

4. The method of claim 1, further comprising:
   if the in-memory bounded buffer is full and an additional event from the client application is received, overwriting an oldest event in the in-memory bounded buffer with the additional event received.

5. The method of claim 1, further comprising:
   if the in-memory bounded buffer is full and an additional event from the client application is received, preventing the additional event received from being stored in the in-memory bounded buffer.

6. The method of claim 1, further comprising:
   if the data store is unavailable, enqueuing the events from the in-memory bounded buffer in a message queue for subsequent writing to the data store after the data store becomes available.

7. The method of claim 1, further comprising:
   when the events in the in-memory bounded buffer are being consumed, storing additional events in a second in-memory bounded buffer to prevent service interruption.

8. An application server comprising:
   a processing device;
   a memory coupled to the processing device, the memory storing a capture service and a consumer executor service, executable by the processing device from the memory, and an in-memory bounded buffer, the capture service to:
   receive events from a client application running on the application server to be stored in a data store; and
   store the events in the in-memory bounded buffer on the application server, the in-memory bounded buffer comprising a plurality of single-threaded segments;
   the in-memory bounded buffer to:
   provide a notification to a buffer flush regulator when a number of events stored in the in-memory bounded buffer reaches a predefined limit;
   receive a request to flush the events from the in-memory bounded buffer; and
   the consumer executor service to:
   consume the events in the in-memory bounded buffer using a dynamically sized thread pool of consumer threads to read segments of the in-memory bounded buffer in parallel.

9. The application server of claim 8, wherein the predefined limit comprises a percentage of the in-memory bounded buffer that is filled with events.

10. The application server of claim 8, wherein the in-memory bounded buffer is further to:
    provide the notification to the buffer flush regulator after a predefined amount of time has passed since a contents of the in-memory bounded buffer was written to the data store.

11. The application server of claim 8, wherein the capture service is further to:
    if the in-memory bounded buffer is full and an additional event from the client application is received, overwrite an oldest event in the in-memory bounded buffer with the additional event received.

12. The application server of claim 8, wherein the capture service is further to:
    if the in-memory bounded buffer is full and an additional event from the client application is received, prevent the additional event received from being stored in the in-memory bounded buffer.

13. The application server of claim 8, wherein the consumer executor service is further to:
if the data store is unavailable, enqueue the events from the in-memory bounded buffer in a message queue for subsequent writing to the data store after the data store becomes available.

14. The application server of claim 8, wherein the consumer executor service is further to:
when the events in the in-memory bounded buffer are being consumed, store additional events in a second in-memory bounded buffer to prevent service interruption.

15. A non-transitory computer-readable storage medium storing instructions which, when executed by a processing device, are capable of causing the processing device to perform operations comprising:
receiving events from a client application running on an application server to be stored in a data store;
storing the events in an in-memory bounded buffer on the application server, the in-memory bounded buffer comprising a plurality of single-threaded segments;
providing a notification to a buffer flush regulator when a number of events stored in the in-memory bounded buffer reaches a predefined limit;
receiving a request to flush the events from the in-memory bounded buffer; and
consuming the events in the in-memory bounded buffer using a dynamically sized thread pool of consumer threads to read segments of the in-memory bounded buffer in parallel.

16. The non-transitory computer-readable storage medium of claim 15, wherein the predefined limit comprises a percentage of the in-memory bounded buffer that is filled with events.

17. The non-transitory computer-readable storage medium of claim 15, wherein the operations further comprise:
providing the notification to the buffer flush regulator after a predefined amount of time has passed since a contents of the in-memory bounded buffer was written to the data store.

18. The non-transitory computer-readable storage medium of claim 15, wherein the operations further comprise:
if the in-memory bounded buffer is full and an additional event from the client application is received, at least one of overwriting an oldest event in the in-memory bounded buffer with the additional event received or preventing the additional event received from being stored in the in-memory bounded buffer.

19. The non-transitory computer-readable storage medium of claim 15, wherein the operations further comprise:
if the data store is unavailable, enqueuing the events from the in-memory bounded buffer in a message queue for subsequent writing to the data store after the data store becomes available.

20. The non-transitory computer-readable storage medium of claim 15, wherein the operations further comprise:
when the events in the in-memory bounded buffer are being consumed, storing additional events in a second in-memory bounded buffer to prevent service interruption.

* * * * *